(12) United States Patent
Shimoda et al.

(10) Patent No.: US 8,879,006 B2
(45) Date of Patent: Nov. 4, 2014

(54) LIQUID CRYSTAL DISPLAY APPARATUS AND LIQUID CRYSTAL TELEVISION

(75) Inventors: Hironori Shimoda, Osaka (JP); Mihoko Watanabe, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/005,768

(22) PCT Filed: Mar. 12, 2012

(86) PCT No.: PCT/JP2012/056296
§ 371 (c)(1),
(2), (4) Date: Sep. 17, 2013

(87) PCT Pub. No.: WO2012/128104
PCT Pub. Date: Sep. 27, 2012

(65) Prior Publication Data
US 2014/0002734 A1 Jan. 2, 2014

(30) Foreign Application Priority Data

Mar. 18, 2011 (JP) ................................ 2011-061493
Jan. 23, 2012 (JP) ................................ 2012-011346

(51) Int. Cl.
H04N 9/30 (2006.01)
G09G 3/34 (2006.01)
H04N 9/67 (2006.01)
G09G 5/04 (2006.01)
G09G 5/36 (2006.01)

(52) U.S. Cl.
CPC .. *H04N 9/30* (2013.01); *G09G 5/04* (2013.01); *G09G 5/366* (2013.01); *G09G 3/3413* (2013.01); *H04N 9/67* (2013.01); *G09G 2340/06* (2013.01); *G09G 2320/0666* (2013.01); *G09G 2300/0452* (2013.01)
USPC ............................. 348/791; 348/659; 345/88

(58) Field of Classification Search
CPC ......... H04N 9/30; H04N 9/31; H04N 9/3108; H04N 9/3105; G09G 3/3601; G09G 3/2003; G09G 3/3611; G09G 3/2074; G09G 5/10; G09G 5/02
USPC ......... 348/791, 453, 553–558, 659–661, 708, 348/718, 790; 345/88, 89, 674, 87
See application file for complete search history.

(56) References Cited

U.S. PATENT DOCUMENTS

| 6,992,718 B1 | 1/2006 | Takahara |
| 2007/0018920 A1* | 1/2007 | Jo .................................... 345/88 |
| 2009/0167657 A1* | 7/2009 | Tomizawa ....................... 345/88 |
| 2011/0128309 A1 | 6/2011 | Miyazaki et al. |

FOREIGN PATENT DOCUMENTS

| JP | 2000-321993 A | 11/2000 |
| JP | 4034022 B2 | 1/2008 |
| WO | WO 2010/013421 A1 | 2/2010 |

* cited by examiner

*Primary Examiner* — Michael Lee
(74) *Attorney, Agent, or Firm* — Birch, Stewart, Kolasch & Birch, LLP

(57) ABSTRACT

There is provided with a color mixing section for mixing yellow to red or green, when red or green is displayed by a liquid crystal television including a liquid crystal panel that has a color filter for four primary colors for red, green, blue and yellow, a backlight that emits light to the liquid crystal panel, and a television signal processing section that converts an inputted color video image signal into signals representing red, green, blue and yellow regarding a color video image.

11 Claims, 16 Drawing Sheets

FIG. 5A

|  | R | G | B | Y |
|---|---|---|---|---|
| R BEFORE CORRECTION | 255 | 0 | 0 | 0 |
| G BEFORE CORRECTION | 0 | 255 | 0 | 0 |
| Y BEFORE CORRECTION | 0 | 0 | 0 | 255 |

FIG. 5B

|  | R | G | B | Y |
|---|---|---|---|---|
| R AFTER CORRECTION | 255 | 0 | 0 | 20 |
| G AFTER CORRECTION | 0 | 255 | 0 | 30 |
| Y AFTER CORRECTION | 20 | 20 | 0 | 230 |

FIG. 7A

BEFORE CORRECTION

|   | x | y | LUMINANCE | RATIO OF LUMINANCE CONFIGURING WHITE |
|---|---|---|---|---|
| R | 0.641 | 0.329 | 26.2 | 16% |
| G | 0.292 | 0.64 | 49.72 | 31% |
| B | 0.1474 | 0.044 | 12.94 | 8% |
| Y | 0.44 | 0.552 | 152.4 | 95% |
| W | 0.293 | 0.307 | 159.6 | 100% |

FIG. 7B

AFTER CORRECTION

|   | x | y | LUMINANCE | RATIO OF LUMINANCE CONFIGURING WHITE |
|---|---|---|---|---|
| R | 0.64 | 0.333 | 33.4 | 21% |
| G | 0.311 | 0.674 | 114.1 | 71% |
| B | 0.147 | 0.044 | 12.94 | 8% |
| Y | 0.443 | 0.55 | 148.4 | 93% |
| W | 0.293 | 0.307 | 159.6 | 100% |

F I G. 9

|   | REC709 | BEFORE CORRECTION | AFTER CORRECTION |
|---|---|---|---|
| W | 100% | 100% | 100% |
| R | 21% | 16% | 21% |
| G | 72% | 31% | 71% |
| B | 7% | 8% | 8% |
| Y | 93% | 92% | 93% |
| C | 79% | 34% | ..... |
| M | 28% | 20% | ..... |

FIG. 11A

|  | R | G | B | C |
|---|---|---|---|---|
| G BEFORE CORRECTION | 0 | 255 | 0 | 0 |
| B BEFORE CORRECTION | 0 | 0 | 255 | 0 |
| C BEFORE CORRECTION | 0 | 0 | 0 | 255 |

FIG. 11B

|  | R | G | B | C |
|---|---|---|---|---|
| G AFTER CORRECTION | 0 | 255 | 0 | 30 |
| B BEFORE CORRECTION | 0 | 0 | 250 | 20 |
| C AFTER CORRECTION | 0 | 0 | 0 | 230 |

FIG. 13A

|  | R | G | B | M |
|---|---|---|---|---|
| R BEFORE CORRECTION | 255 | 0 | 0 | 0 |
| B BEFORE CORRECTION | 0 | 0 | 255 | 0 |
| M BEFORE CORRECTION | 0 | 0 | 0 | 255 |

FIG. 13B

|  | R | G | B | M |
|---|---|---|---|---|
| R BEFORE CORRECTION | 255 | 0 | 0 | 30 |
| B BEFORE CORRECTION | 0 | 0 | 255 | 20 |
| M BEFORE CORRECTION | 0 | 0 | 0 | 230 |

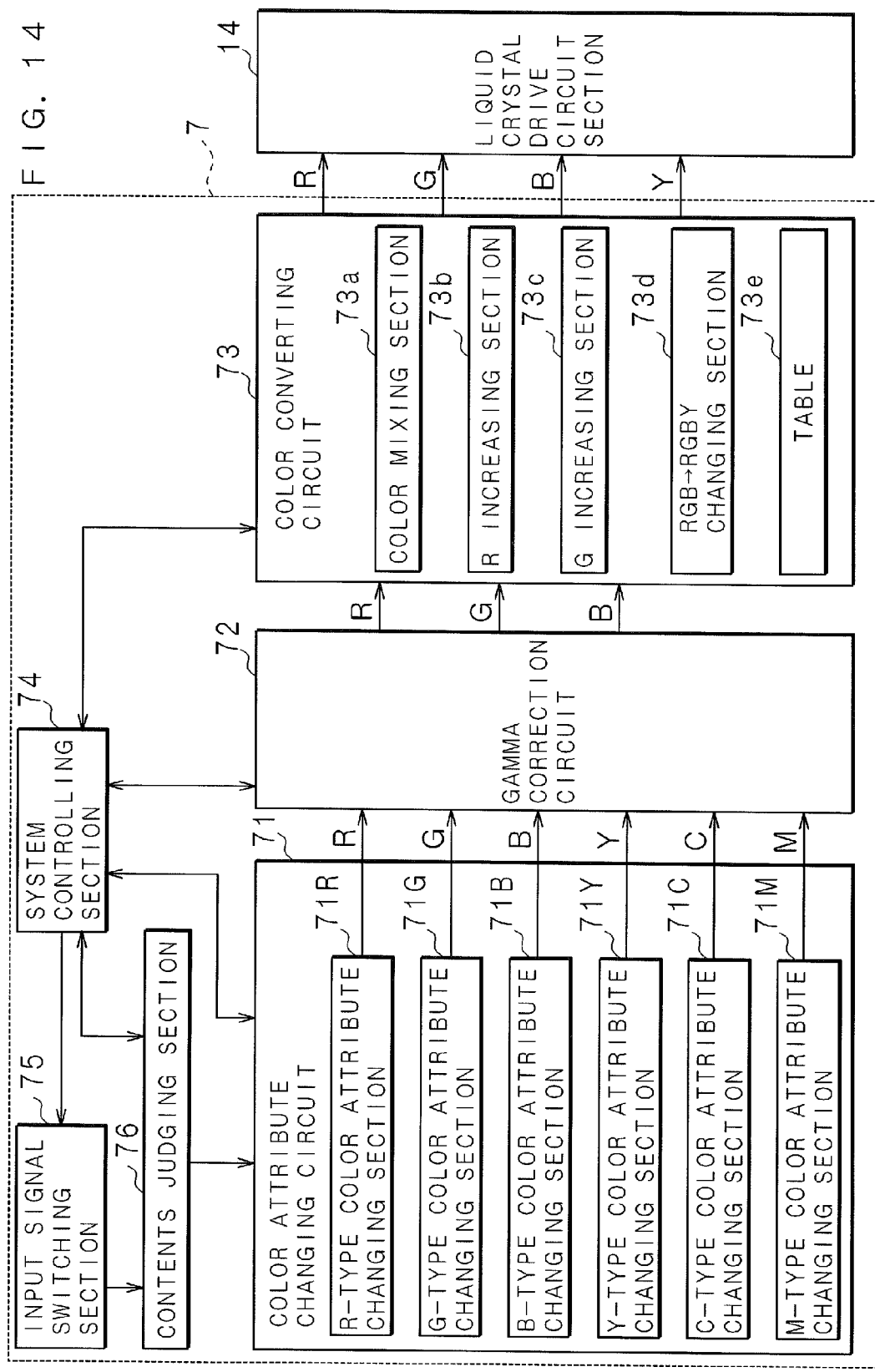

LIQUID CRYSTAL DISPLAY APPARATUS AND LIQUID CRYSTAL TELEVISION

This application is the national phase under 35 U.S.C. §371 of PCT International application No. PCT/JP2012/056296 which has an International filing date of Mar. 12, 2012 and designated the United States of America.

FIELD

The present invention relates to a liquid crystal display apparatus and a liquid crystal television that display a color video image with a four-primary-color system.

BACKGROUND

Recently, the image quality of liquid crystal television is enhanced. A liquid crystal display with the four-primary-color system is proposed in which a liquid crystal panel is improved from three-primary-color version to four-primary-color version in order to expand the gamut (e.g., Japanese Patent No. 4034022). For example, when red, green, blue and yellow are selected as the four primary colors, it is possible to expand the gamut for yellow or cyan in the liquid crystal panel. When yellow is added as the primary color, it is possible to expand the gamut for green and thus to expand the gamut for cyan which is the complementary color for green and blue.

SUMMARY

However, compared to a liquid crystal display apparatus with the three-primary-color system, the liquid crystal display apparatus with the four-primary-color system has a smaller pixel area per unit display area of red, green, blue and yellow, and has the problem that the luminance for each pixel is decreased. This decrease of luminance significantly causes on displaying a color close to the primary colors, especially, red and green.

This problem may be solved by a method in which the coloration of backlight is changed or a method in which the coloration of color filters for green and red is changed. However, both of methods need decreasing the color purity, for increasing the luminance with the same pixel size. Therefore, it may cause the problem that the gamut for normal green and red may cannot be reproduced.

The present invention is made in view of such circumstances, and an object is to provide a liquid crystal display apparatus and a liquid crystal television which can increase the luminance of each pixel without decreasing the color purity of four primary colors, wherever possible.

A liquid crystal display apparatus according to the present invention includes a liquid crystal panel which has color filters for red, green and blue and a color filter for at least one complementary color of cyan, magenta and yellow having complementary color relationship to each of red, green and blue, includes a backlight which emits light to the liquid crystal panel, converts an inputted color video image signal into signals representing red, green, blue and the complementary color regarding the color video image, displays a color video image based on each converted signal, and comprises a color mixing section that, when red, green or blue of primary color not having complementary color relationship to the complementary color is displayed, mixes the complementary color into red, green or blue of primary color.

A liquid crystal display apparatus according to the present invention includes the liquid crystal panel that has color filters for red, green and blue, and a color filter for yellow, and includes the color mixing section that is configured to mix yellow into red or green when red or green is displayed.

A liquid crystal display apparatus according to the present invention includes the color mixing section that is configured to perform a processing for increasing a signal level of yellow when a signal level of red or green is not smaller than a first signal level and signal levels of other colors are smaller than a second signal level which is smaller than the first signal level.

A liquid crystal display apparatus according to the present invention includes a configuration that an amount for increasing the signal level of yellow when the signal level of green is not smaller than the first signal level is larger than an amount for increasing the signal level of yellow when the signal level of red is not smaller than the first signal level.

A liquid crystal display apparatus according to the present invention comprises an increasing section that, when red or green is displayed, increases the signal level of red or green.

A liquid crystal display apparatus according to the present invention comprises a changing section that, when yellow is displayed, increases the signal levels of red and green and decreases the signal level of yellow.

A liquid crystal display apparatus according to the present invention comprises a composite amount accepting section that accepts a composite amount of yellow, wherein the color mixing section is configured to perform a processing for increasing the signal level of yellow based on the composite amount accepted by the composite amount accepting section.

A liquid crystal display apparatus according to the present invention comprises a composite necessity accepting section that accepts a necessity of composite, wherein the color mixing section is configured to perform a processing for mixing yellow when the composite necessity accepting section accepts that the composite is necessary.

A liquid crystal display apparatus according to the present invention comprises a display mode accepting section that accepts a switch of display mode, and a table that stores an amount for mixing yellow to red or green, wherein the color mixing section is configured to utilize the table for mixing yellow to red or green, when a display mode is switched to a predetermined display mode.

A liquid crystal display apparatus according to the present invention comprises a judging section that judges a type of the color video image, wherein the color mixing section is configured to perform a mixing processing based on a result of judgment performed by the judging section.

A liquid crystal display apparatus according to the present invention comprises a judging section that judges about a device which is a source sending the color video image signal, wherein the color mixing section is configured to perform a mixing processing based on a result of judgment performed by the judging section.

A liquid crystal display apparatus according to the present invention comprises a gamma correction processing section that performs a gamma correction processing onto a signal of each color based on a mixing processing performed by the color mixing section.

A liquid crystal television according to the present invention comprises a video image receiving section that receives a color video image signal, and any one of the liquid crystal display apparatuses described above, wherein the liquid crystal display apparatus is configured to display a color video image based on the color video image signal received by the video image receiving section.

In the present invention, when the liquid crystal panel includes color filters for red, green and blue and includes a color filter for any one of cyan, magenta and yellow which are complementary colors have a complementary color relationship to each color, and further when red, green or blue of primary color not having the complementary color relationship to the complementary color is displayed, the complementary color is mixed to the primary color and thus it is possible to increase the luminance of primary color. Because the primary color has good compatibility with the complementary color, the coloring is not reduced by mixing the complementary color.

In the present invention, it is possible to increase the luminance of red by mixing yellow when red is displayed. Similarly, it is possible to increase the luminance of green by mixing yellow when green is displayed. Because red and green have good compatibility with yellow, the coloring is not reduced by mixing yellow.

In the present invention, the signal level of yellow is increased, when the signal level of red is not smaller than the first signal level and the signal levels of other colors are smaller than the second signal level. In other words, the luminance deficiency of red is compensated by increasing the signal level of yellow, when the signal levels of green, blue and yellow are small and the luminance of red is significantly decreased.

Similarly, the signal level of yellow is increased, when the signal level of green is not smaller than the first signal level and the signal levels of other colors are smaller than the second signal level. In other words, the luminance deficiency of green is compensated by increasing the signal level of yellow, when the signal levels of red, blue and yellow are small and the luminance of green is significantly decreased.

Green has a larger problem for decreasing the luminance than red. Thus, in the present invention, the signal level of yellow is increased larger at the time when the primary color of green is displayed than the time when the primary color of red is displayed.

In the present invention, the luminance deficiency for red is compensated by increasing the signal level of red when red having non-saturated luminance is displayed. Similarly, the luminance deficiency for green is compensated by increasing the signal level of green when the green having non-saturated luminance is displayed.

In the present invention, the signal levels of red and green are increased and the signal level of yellow is decreased, when yellow is displayed. Thus, it is possible to implement the color reproducibility closer to the REC 709 of CCIR (Comite Consultatif Internationale des Radio-communications) or the like.

In the present invention, it is possible to obtain a desired color reproducibility and brightness for a user by adjusting the increasing amount of signal level of yellow.

In the present invention, yellow is mixed to red and green when the composite necessity accepting section accepts that the composite is necessary. A user can select to give the priority to the color reproducibility or the brightness of color video image.

In the present invention, the display mode accepting section accepts the switch of display mode. When the display mode is switched to a predetermined display mode, the color mixing section utilizes the table storing the amount for mixing yellow to red or green and mixes yellow to red or green.

In the present invention, it is possible to automatically switch a color mixing processing based on the type of contents (color video image) seen by a user. Thus, it is possible to display each contents with the optical image quality.

In the present invention, it is possible to automatically switch the color mixing processing based on the source device sending the color video image signal to be displayed. Thus, the video image signal outputted from each input source can be displayed with the optimal image quality, based on each input source (device) selected by a user. For example, when the video image signal outputted from a BD (Blu-ray Disc) recorder is displayed, the color mixing processing optimal for the movie can be performed. When the video image signal outputted from a game machine is displayed, the color mixing processing optimal for the game can be performed.

In the present invention, when the complementary color is mixed to red, green or blue of primary color, a gamma correction processing based on the performed color mixing processing is performed. Thus, when the inputted color video image signal (three-color-signal) is converted into signals representing red, green, blue and complementary color (four-color-signal), it is possible to perform not only the color mixing processing but also the gamma correction processing based on the color mixing processing.

According to the present invention, it is possible to increase the luminance of each pixel without decreasing the color purity of four primary colors, wherever possible.

The above and further objects and features will more fully be apparent from the following detailed description with accompanying drawings.

BRIEF DESCRIPTION OF THE DRAWINGS

FIG. 5A is a chart that shows a composite amount and the like of yellow.

FIG. 5B is a chart that shows a composite amount and the like of yellow.

FIG. 7A is a chart that shows a luminous change of each primary color based on signal processing performed by the television signal processing section.

FIG. 7B is a chart that shows a luminous change of each primary color based on signal processing performed by the television signal processing section.

FIG. 9 is a chart that shows a percentage of luminance for each primary color configuring white before and after the correction, and a percentage of luminance for each primary color configuring white in the REC 709 standard.

FIG. 11A is a chart that shows a composite amount and the like of cyan according to the alternative example 1.

FIG. 11B is a chart that shows a composite amount and the like of cyan according to the alternative example 1.

FIG. 13A is a chart that shows a composite amount and the like of magenta according to the alternative example 2.

FIG. 13B is a chart that shows a composite amount and the like of magenta according to the alternative example 2.

FIG. 14 is a block diagram that shows an example configuration of the television signal processing section.

DETAILED DESCRIPTION

The present invention is explained below in detail, in reference with drawings showing embodiments of the present invention.

Embodiment 1

Figure 1:
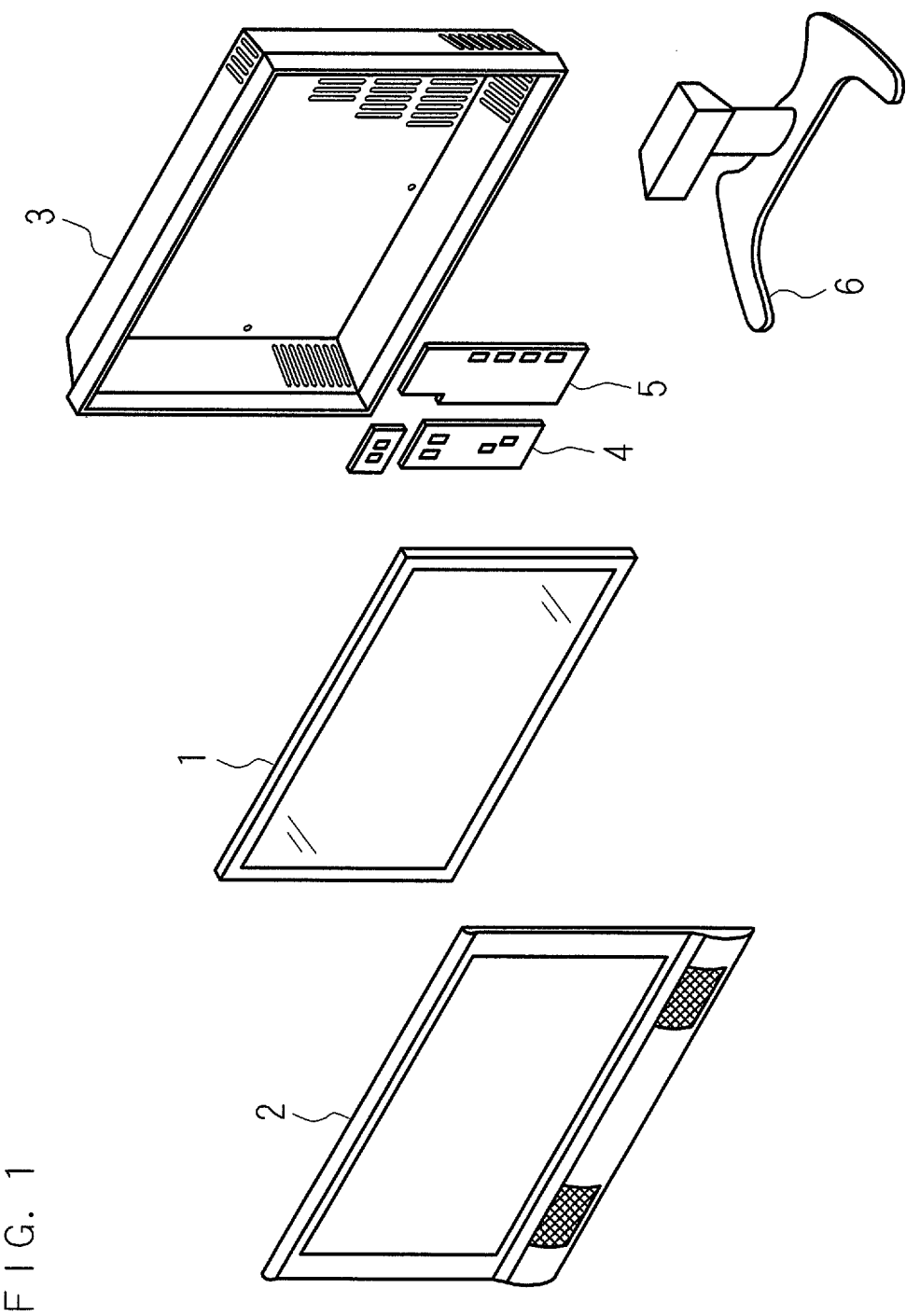
FIG. 1 is an exploded perspective view at the front side that shows an example configuration of a liquid crystal television according to the present invention.

FIG. 1 is an exploded perspective view at the front side that shows an example configuration of a liquid crystal television according to the present invention. The liquid crystal television according to the present embodiment can inhibit decreasing the luminance of green and red, although a conventional four-primary-color liquid crystal panel cannot inhibit. Furthermore, the liquid crystal television according to the present embodiment can keep the brightness similar to the three-primary-color liquid crystal panel. The liquid crystal television includes a liquid crystal panel module 1 that has a display surface at the front side and is a substantial rectangular parallelepiped with wide plate shape, a front cabinet 2 that surrounds the peripheral portion of the liquid crystal panel module 1, a back cabinet 3 that covers the back side of the liquid crystal panel module 1, a tuner (receiving section) 4 that receives a video image signal (television broadcast), an electric circuit 5, and a stand 6 that supports the liquid crystal panel module 1 to keep the standing condition.

Figure 2:
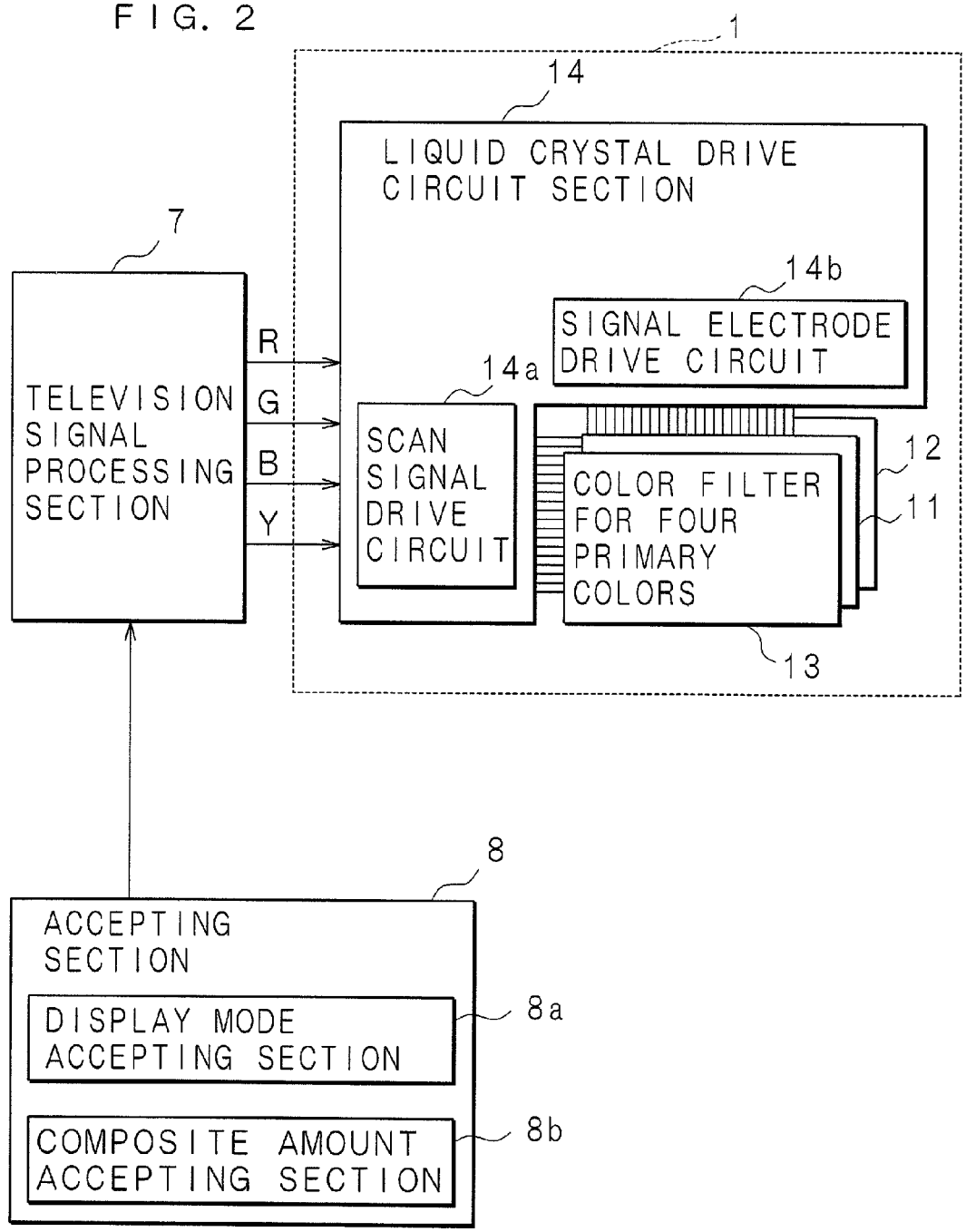
FIG. 2 is a block diagram that shows an example configuration of main sections in the liquid crystal television.

FIG. 2 is a block diagram that shows an example configuration of main sections in the liquid crystal television.

The liquid crystal television includes a liquid crystal panel module 1 which is configured with a liquid crystal panel 11 that has a color filter for four primary colors 13 for red (R), green (G), blue (B) and yellow (Y), a backlight 12 that emits light to the liquid crystal panel 11 from the back side, and a liquid crystal drive circuit section 14 that drives the liquid crystal panel 11 based on the signals of red, green, blue and yellow converted by a television signal processing section 7 described later and that contributes to display a color video image; the television signal processing section 7 that converts the color video image signal received by the tuner 4 into signals representing red, green, blue and yellow for the color video image; and an accepting section 8 that accepts several operations. The liquid crystal display apparatus according to the present invention is implemented by the television signal processing section 7 and the liquid crystal panel module 1.

The liquid crystal panel 11 is formed with two glass substrates, whose shapes are substantially rectangular, which are arranged to oppose to each other with a spacer, and into which liquid crystal is sealed. The color filter for four primary colors 13 and an opposing electrode are arranged on an opposing surface of the glass substrate at the front side. On the opposing surface of the glass substrate at the back side, scan lines in the lateral direction and signal lines in the vertical direction are arranged in a matrix manner. At the intersections of the scan lines and signal lines, active elements are arranged for applying voltage to a liquid crystal portion corresponding to each pixel. For example, a TFT (Thin Film Transistor) and a pixel electrode are arranged at each intersection. A gate electrode for each TFT is connected to the scan line and a source electrode for each TFT is connected to the signal line. In addition, although not shown in drawings, a polarized film is arranged at the outer side of each glass substrate, in order to transmit the light of backlight 12 when the TFT is in the off-condition.

Figure 3A:
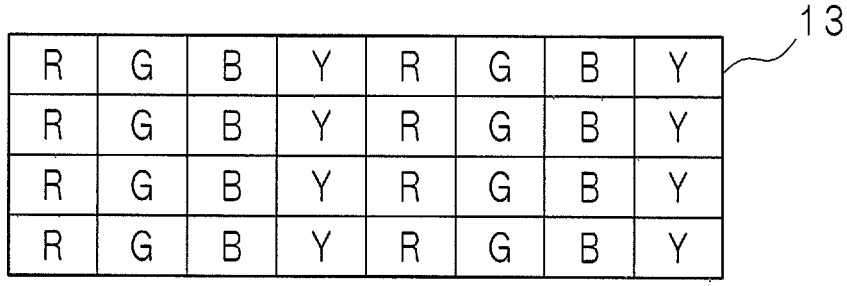
FIG. 3A is an explanation view that schematically shows an example configuration of color filter for four primary colors.
Figure 3B:
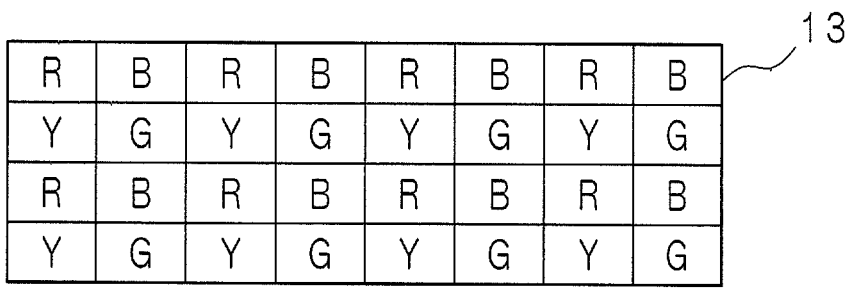
FIG. 3B is an explanation view that schematically shows an example configuration of color filter for four primary colors.
Figure 3C:
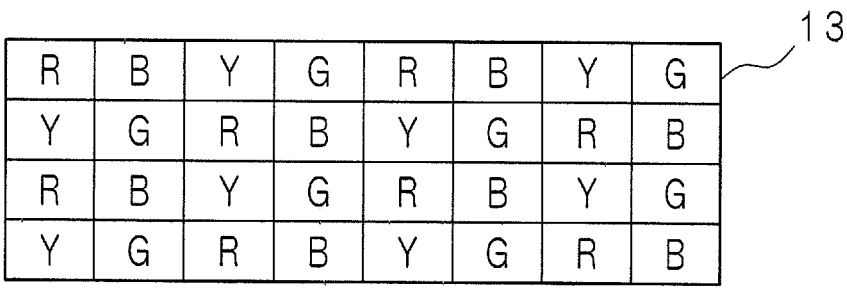
FIG. 3C is an explanation view that schematically shows an example configuration of color filter for four primary colors.

FIG. 3A, FIG. 3B and FIG. 3C are explanation views that schematically show example configurations of the color filter for four primary colors. As shown in FIG. 3A, the color filter for four primary colors 13 has pixel filters for four colors, i.e., red, green, blue and yellow, which are arranged in correspondence with each pixel on the liquid crystal panel 11. The arrangement of pixel filters is not limited to a specific method. For example, each pixel filter for red (R), green (G), blue (B) and yellow (Y) may be arranged in the lateral direction as shown in FIG. 3A. For example, the pixel filters for four colors, i.e., red, green, blue and yellow, may be arranged as shown in FIG. 3B, the pixel filter for red (R) and the pixel filter for blue (B) are arranged alternately in the lateral direction to form the RB lateral row, the pixel filter for yellow (Y) and the pixel filter for green (G) are arranged alternately in the lateral direction to form the YG lateral row, and the RB and YG lateral rows are arranged alternately and adjacently in the vertical direction. For example, the pixel filters for red (R), blue (B), yellow (Y) and green (G) may be arranged repeatedly with this sequence in the lateral direction as shown in FIG. 3C to form the RBYG row, the RBYG rows are arranged in the vertical direction, and each RBYG row adjacent in the vertical direction is shifted with two pixels from the adjacent RBYG row.

The backlight 12 includes a backlight chassis whose shape is like a dish, and includes a reflection sheet and plural light sources that are arranged on the backlight chassis. For example, the light source is a white LED or cold cathode fluorescent lamp. An optical sheet is arranged at the front side of the backlight 12, in order to uniformly diffuse the light emitted from the backlight 12 toward the liquid crystal panel 11.

The liquid crystal drive circuit section 14 includes a scan signal drive circuit 14a that is connected to the scan lines of the liquid crystal panel 11, and a signal electrode drive circuit 14b that is connected to the signal lines. For example, the scan signal drive circuit 14a may be configured with a shift register circuit. The scan signal drive circuit 14a sequentially applies a scan signal to each scan line to make the TFT gates become the on-condition, as the TFT gates are arranged in the lateral direction. For example, the signal electrode drive circuit 14b may be configured with a shift register circuit and a sample hold circuit. The signal electrode drive circuit 14b outputs signals for red, green, blue and yellow to each signal line. The signals are applied to the drains or sources of the TFT gates arranged in the vertical direction.

As the scan signal drive circuit 14a applies the scan signal to a scan line at a period, it is possible to make the TFTs arranged in the horizontal direction become in the on-condition at the same time. As the signal electrode drive circuit 14b applies signals regarding color video images with red, green, blue and yellow for one horizontal line onto the signal line during the period, it is possible to write information regarding the color video images onto the intersection pixel. By sequentially scanning this in the vertical direction, the voltage for the signals regarding the color video image with red, green, blue and yellow is applied to pixel electrodes corresponding to all the pixels of the liquid crystal panel 11. Because the amount of transmitting light passing to the liquid crystal layer is changed by the voltage applied to the pixel electrode, the amount of transmitting light of the backlight 12 is controlled by the magnitude of signal regarding the color video image. The light with four colors transmitted through each pixel filter for red, green, blue and yellow is displayed as the full color video image to a viewer in accordance with the principle of addictive color mixture.

For example, the accepting section 8 includes an infrared receiving element that receives infrared remote control signals sent from a remote control apparatus not shown in drawings. The accepting section 8 works as a display mode accepting section (composite necessity accepting section) 8a and a composite amount accepting section 8b.

The display mode accepting section 8a accepts selections of a first display mode performed by the signal processing according to the present embodiment and a second display mode not performed by the signal processing according to the present embodiment. For example, the first display mode is a so-called cinema mode and THX mode, and the second display mode is a dynamic mode.

The composite amount accepting section 8b accepts the composite amount of yellow mixed to red and green, to compensate the decrease of luminance of red and green as described later.

Figure 4:
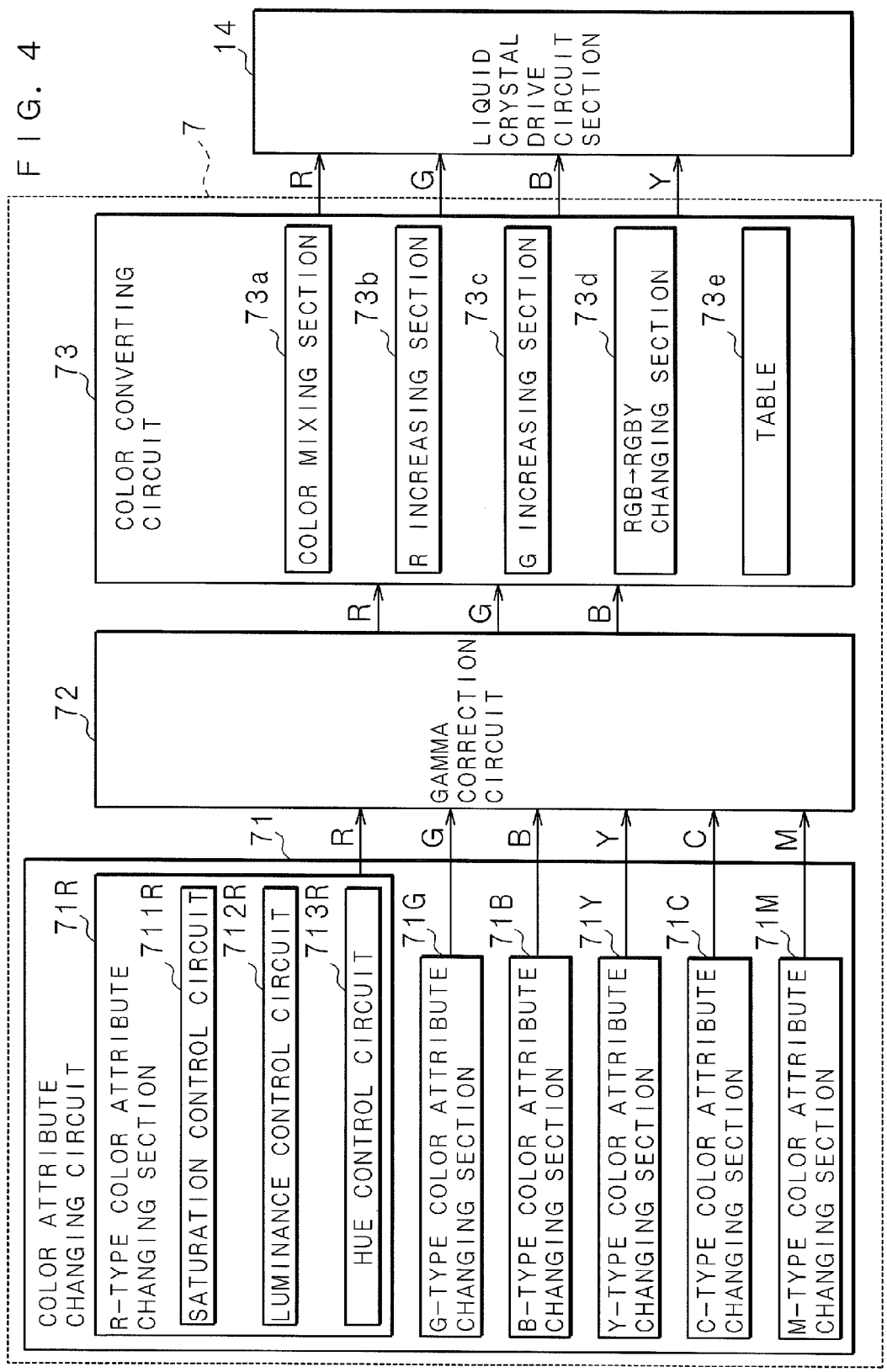
FIG. 4 is a block diagram that shows an example configuration of a television signal processing section.

FIG. 4 is a block diagram that shows an example configuration of the television signal processing section 7. The television signal processing section 7 includes a color attribute changing circuit 71, a gamma correction circuit 72 and a color converting circuit 73.

The color attribute changing circuit 71 changes the color attribute of the inputted color video image signal and adequately generates signals of red (R), green (G), blue (B), yellow (Y), cyan (C), and magenta (M). The color attribute changing circuit 71 includes an R-type color attribute changing section 71R that changes the color attribute based on the red. The R-type color attribute changing section 71R is configured with a saturation control circuit 711R that changes the saturation (chroma), a luminance control circuit 712R that changes the luminance (lightness), and a hue control circuit 713R that changes the hue. The R-type color attribute changing section 71R changes the saturation, luminance and hue of the color video image signal, in accordance with the operation instruction accepted by the accepting section 8. Similarly, the color attribute changing circuit 71 includes a G-type color attribute changing section 71G, a B-type color attribute changing section 71B, a Y-type color attribute changing section 71Y, a C-type color attribute changing section 71C and an M-type color attribute changing section 71M, which respectively change the color attribute based on the green, blue, yellow, cyan, and magenta. The color attribute changing circuit 71 gives the signals for red (R), green (G), blue (B), yellow (Y), cyan (C) and magenta (M), on which the color attribute changing processing has been performed, to the gamma correction circuit 72.

The gamma correction circuit 72 performs gamma correction processing for the signal of each color, and gives the red (R), green (G), and blue (B) signals, on which the gamma correction has been performed, to the color converting circuit 73.

The color converting circuit 73 converts the red, green and blue signals given by the gamma correction circuit 72 into the red, green, blue and yellow signals in correspondence with each color pixel of the color filter for four primary colors 13. It is preferable for performing the converting processing to utilize a look up table (LUT: Look Up Table) that is not shown in drawings and stores the relationship between the levels of red, green and blue signals and the levels of red, green, blue and yellow signals. Alternatively, the linear conversion, such as the matrix conversion, may be utilized for converting signals of each color.

In addition, the color converting circuit 73 includes a color mixing section 73a that performs a processing to mix yellow into red or green when the primary color of red or green is displayed on the liquid crystal panel 11. Particularly, the color mixing section 73a performs processing for increasing the signal level of yellow, when the signal level of red is not smaller than a first signal level and the signal levels of other colors are smaller than a second signal level that is smaller than the first signal level. In this embodiment, an example is explained in which each color is represented by 255 gradation, the first signal level is 255 and the second signal level is 1. In addition, the color converting circuit 73 includes a table 73e that stores the amount for increasing the signal level of yellow. The color mixing section 73a is configured to refer the table 73e for increasing the signal level of yellow.

In addition, the color converting circuit 73 includes an R increasing section 73b that increases the signal level of red when red is displayed, and a G increasing section 73c that increases the signal level of green when green is displayed. The R increasing section 73b performs the processing for increasing the signal level of red, when the signal level of red is smaller than the first signal level and the signal levels of other colors are smaller than the second signal level. Similarly, the G increasing section 73c performs the processing for increasing the signal level of green, when the signal level of green is smaller than the first signal level and the signal levels of other colors are smaller than the second signal level.

Furthermore, the color converting circuit 73 includes an RGB→RGBY changing section 73d that converts the signals of red, green and blue given by the gamma correction circuit 72 into the signals of red, green, blue and yellow in correspondence with each color pixel of the color filter for four primary colors 13. When yellow is displayed, the RGB→RGBY changing section 73d increases the signal levels of red and green and decreases the signal level of yellow. For example, when the signal level of yellow is not smaller than the first signal level and the signal levels of other colors are smaller than the second signal level, the RGB→RGBY changing section 73d increases the signal levels of red and green and decreases the luminance signal of yellow. It is preferable for setting the change amount of signal levels of red, green and yellow, to match the signal level of each color after the changing processing with a predetermined standard, for example, the REC 709 of the CCIR (Comite Consultatif Internationale des Radio-communications).

The signals to be processed by the color converting circuit 73 may be analog signals or digital data signals.

FIG. 5A and FIG. 5B are charts that show composite amounts and the like of yellow. FIG. 5A represents the signal levels of red, green, blue and yellow before the color mixing processing. FIG. 5B represents signal levels and ratios of red, green, blue and yellow color after the color mixing processing. When the primary color of red is displayed, i.e., when the signal level of red is 255 and the signal levels of green, blue and yellow are 0 as shown in FIG. 5A, the color mixing section 73a increases the signal level of yellow from 0 to 20. In addition, when the primary color of green is displayed, i.e., when the signal level of green is 255 and the signal levels of red, blue and yellow are 0 as shown in FIG. 5A, the color mixing section 73a increases the signal level of yellow from 0 to 30.

On the other hand, when the primary color of yellow is displayed, i.e., when the luminance signal level of yellow is 255 and the signal levels of red, green and blue are 0 as shown in FIG. 5A, the RGB→RGBY changing section 73d increases the signal levels of red and green from 0 to 20 and decreases the luminance signal level of yellow from 255 to 230.

Figure 6:
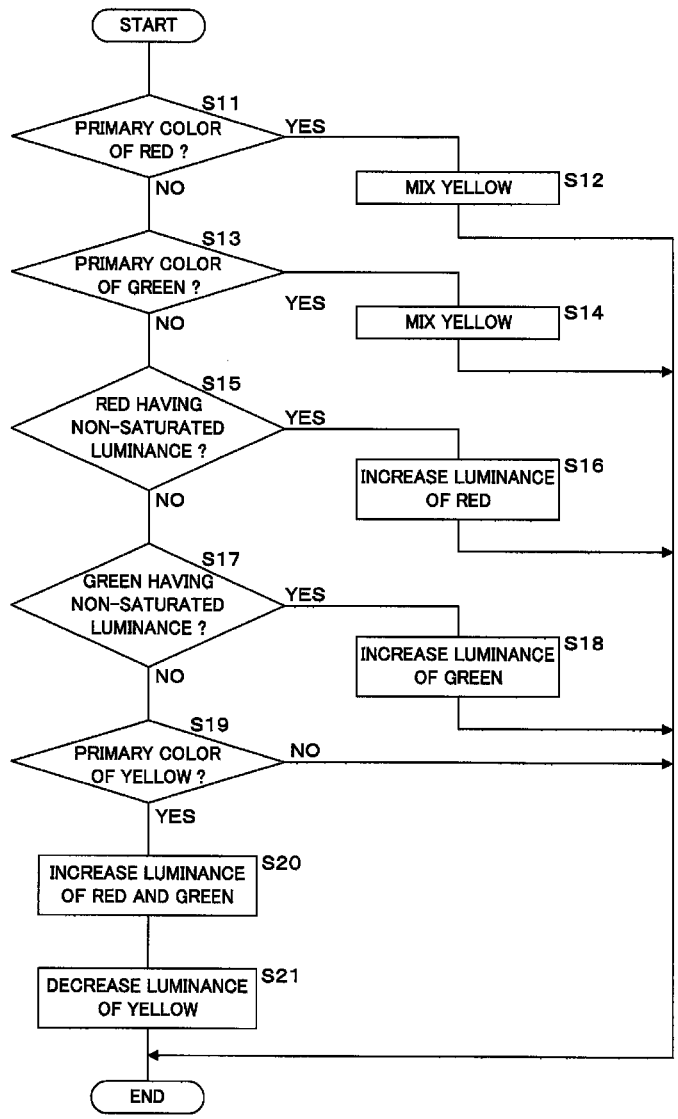
FIG. 6 is a flowchart that shows a procedure of the television signal processing section.

FIG. 6 is a flowchart that shows a procedure of the television signal processing section 7. The television signal processing section 7 performs the processing described below, when the display mode accepting section 8a accepts the first display mode. The television signal processing section 7 judges whether the signal converted into the four-primary-color system is the primary color of red or not (step S11). For example, the television signal processing section 7 judges whether or not the signal level of red is 255 and the signal levels of green, blue and yellow are 0. When having judged that the converted signal is red (step S11: YES), the television signal processing section 7 mixes yellow into red (step S12) and ends the procedure. Particularly, the television signal processing section 7 increases the signal level of yellow. For example, the television signal processing section 7 reads out the table 73e and increases the signal level of yellow from 0 to 20 as shown in FIG. 5A and FIG. 5B. On the other hand, when the composite amount accepting section 8b accepts the composite amount of yellow, the accepted composite amount is stored in the table 73e. Thus, the television signal processing section 7 increases signal level of yellow based on the stored composite amount.

When having judged that the converted signal is not red (step S11: NO), the television signal processing section 7 judges whether the signal converted into the four-primary-color system is the primary color of green or not (step S13). For example, the television signal processing section 7 judges whether or not the signal level of green is 255 and the signal levels of red, blue and yellow are 0. When having judged that the converted signal is green (step S13: YES), the television signal processing section 7 mixes yellow into green (step S14) and ends the procedure. Particularly, the television signal processing section 7 increases the signal level of yellow. For example, the television signal processing section 7 reads out the table 73e and increases the signal level of yellow from 0 to 30 as shown in FIG. 5A and FIG. 5B. Similarly to the step S12, when the composite amount accepting section 8b accepts the composite amount of yellow, the accepted composite amount is stored in the table 73e. Thus, the television signal processing section 7 increases signal level of yellow based on the stored composite amount.

When having judged that the signal converted into the four-primary-color system is not the primary color of green (step S13: NO), the television signal processing section 7 judges whether the signal converted into the four-primary-color system is the red having non-saturated luminance or not (step S15). For example, the television signal processing section 7 judges whether or not the signal level of red is smaller than 255 and the signal levels of green, blue and yellow are 0. When having judged that the signal converted into the four-primary-color system is the red having non-saturated luminance (step S15: YES), the television signal processing section 7 increases the signal level of red (step S16) and ends the procedure.

When having judged that the converted signal is not the red having non-saturated luminance (step S15: NO), the television signal processing section 7 judges whether the signal converted into the four-primary-color system is the green having non-saturated luminance or not (step S17). When having judged that the signal converted into the four primary colors' system is the green having non-saturated luminance (step S17: YES), the television signal processing section 7 increases the signal level of green (step S18) and ends the procedure.

When having judged that the signal converted into the four-primary-color system is not the green having non-saturated luminance (step S17: NO), the television signal processing section 7 judges whether the signal converted into the four-primary-color system is the primary color of yellow or not (step S19). When having judged that the signal converted into the four-primary-color system is not the primary color of yellow (step S19: NO), the television signal processing section 7 ends the procedure. When having judged that the signal converted into the four-primary-color system is the primary color of yellow (step S19: YES), the television signal processing section 7 increases the signal levels of red and green (step S20). Then, the television signal processing section 7 decreases the signal level of yellow (step S21), and ends the procedure.

Figure 8:
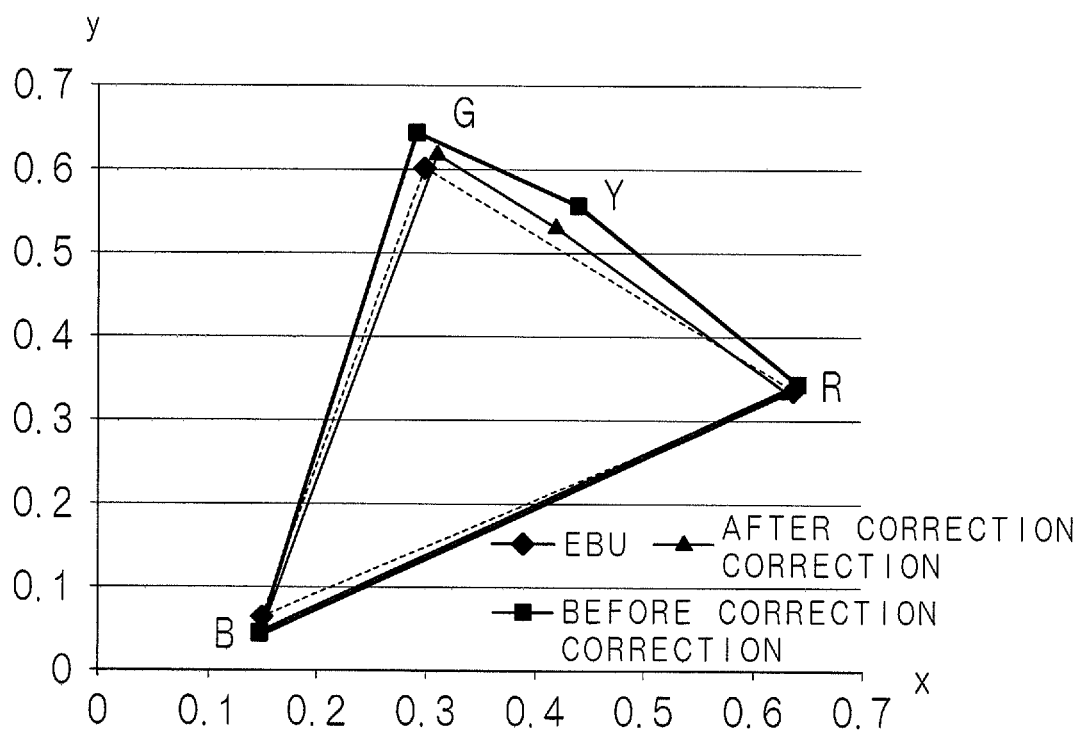
FIG. 8 is a XY chromaticity diagram that shows effects of the signal processing performed by the television signal processing section.

FIG. 7A and FIG. 7B are charts that show the luminous change of each primary color based on signal processing performed by the television signal processing section 7. FIG. 8 is a XY chromaticity diagram that shows effects of the signal processing performed by the television signal processing section 7. FIG. 7A represents the x-value, y-value and luminance of red (R), green (G), blue (B), yellow (Y) and white (W) before the correction processing. FIG. 7B represents the x-value, y-value and luminance of each color after the correction processing, i.e., after the processing described above. In addition, the ratio of luminance with which each color before and after the correction processing configures white is represented. As shown in FIG. 7A, FIG. 7B, and FIG. 8, the luminance ratios of red, green, blue and yellow configuring white before the correction processing are 16%, 31%, 8% and 95%. These ratios indicate the different gamut from a predetermined standard, for example, the EBU (European Broadcasting Union) of European standard.

The luminance ratios of red, green, blue and yellow configuring white after the correction processing are 21%, 71%, 8% and 93%, respectively. It is apparent that the luminance of primary colors, red, green and blue is enhanced. In addition, the gamut after the correction processing matches better to the predetermined standard. Generally, the wider gamut is more preferable. However, there is the case that the gamut matching with the predetermined standard is required. In that case, the gamut after the correction is preferable.

FIG. 9 is a chart that shows a percentage of luminance for each primary color configuring white before and after the correction, and a percentage of luminance for each primary color configuring white in the REC 709 standard. In the liquid crystal panel module 1 with the four-primary-color system as shown by FIG. 9, the pixel areas of the red, green, blue and yellow for the unit display area are small. The luminance ratios of red, green, blue and yellow configuring white before the signal correction processing are smaller, except for the ratio of blue, than the luminance ratios defined by the REC 709 standard. On the other hand, the luminance ratios of red, green, blue and yellow configuring white after the signal correction processing are 21%, 71%, 8% and 93%, respectively. Then, they satisfy the REC 709 standard.

In the present embodiment, it is possible to increase the luminance of each pixel, especially the luminance of red and green, without decreasing the color purity of four primary colors wherever possible. In the liquid crystal panel module 1 with the four-primary-color system, the area of each pixel color filter for unit display area may be smaller than the area in the liquid crystal panel with the three-primary-color system, and the luminance of primary colors may be decreased. However, when red and green of primary color is displayed, it is possible to compensate the luminance decrease of red and green by mixing yellow. When yellow is mixed, the coloration of red and green is changed. However, the original gamut of red, green and blue in the liquid crystal panel with the four-primary-color system is wider than that in the liquid crystal panel with the three-primary-color system as shown in FIG. 8, and becomes closer to the EBU standard. Therefore, it may not cause a significant problem. In addition, yellow can be made by the addictive color mixture of red and green, and has good compatibility with red and green. Therefore, the mixing of yellow does not reduce the coloring of red and green, and it is possible to prevent the luminance decrease of red and green.

In addition, the problem regarding the luminance decrease is larger for green than for red. Thus, it is configured that the signal level of yellow is increased larger when green of primary color is displayed than when red of primary color is displayed. Therefore, it is possible to prevent the luminance decrease of red and green efficiently, without reducing the coloring of red and green.

Further, when red or green having non-saturated luminance is displayed, it is possible to compensate the luminance deficiency for red or green by increasing the signal level of red or green.

Furthermore, the user can obtain the required color reproducibility and brightness, by adjusting the composite amount of yellow.

Moreover, the luminance of each primary color in the liquid crystal panel module 1 with the four-primary-color system is smaller than the luminance in the liquid crystal panel with the three-primary-color system, and thus the ratio of each color configuring white may be depart from the REC 709. However, it is possible to make the luminance ratio of each color configuring white become closer to the REC 709, wherever possible, by decreasing the signal level of yellow and increasing the signal levels of red and green, properly.

Alternative Example 1

The liquid crystal television according to the alternative example 1 includes a color filter for four primary colors 113 for red (R), green (G), blue (B) and cyan (C), and the contents of processing performed by the television signal processing section 7 are different from those of previous embodiment. The differences are mainly explained below.

Figure 10A:
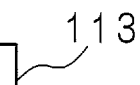
FIG. 10A is an explanation view that schematically shows an example configuration of color filter for four primary colors according to an alternative example 1.
Figure 10B:
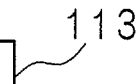
FIG. 10B is an explanation view that schematically shows an example configuration of color filter for four primary colors according to the alternative example 1.

FIG. 10A and FIG. 10B are explanation views that schematically show example configurations of the color filter for four primary colors 113 according to the alternative example 1. As shown in FIG. 10A and FIG. 10B, the color filter for four primary colors 113 according to the alternative example 1 has pixel filters for four colors, i.e., red, green, blue and cyan, which are arranged in correspondence with each pixel of the liquid crystal panel 11. Each pixel filter for red (R), green (G), blue (B) and cyan (C) may be arranged in the lateral direction.

The color converting circuit 73 of the television signal processing section 7 according to the alternative example 1 includes a color mixing section that is not shown in drawings but performs processing for mixing cyan into green or blue when green or blue of primary color is displayed on the liquid crystal panel 11. Particularly, the color mixing section performs processing for increasing the signal level of cyan, when the signal level of green or blue is not smaller than a first signal level and the signal levels of other colors are smaller than a second signal level that is smaller than the first signal level.

In addition, the color converting circuit 73 includes a G increasing section that is not shown in drawings but increases the signal level of green when green is displayed, and a B increasing section that is not shown in drawings but increases the signal level of blue when blue is displayed. The G increasing section performs the processing for increasing the signal level of green, when the signal level of green is smaller than the first signal level and the signal levels of other colors are smaller than the second signal level. Similarly, the B increasing section performs the processing for increasing the signal level of blue, when the signal level of blue is smaller than the first signal level and the signal levels of other colors are smaller than the second signal level.

Furthermore, the color converting circuit 73 includes an RGB→RGBC changing section that is not shown in drawings but increases the signal levels of green and blue and decreases the signal level of cyan when cyan is displayed. Particularly, the RGB→RGBC changing section performs the processing for increasing the signal levels of green and blue, and decreasing the luminance signal of cyan, when the signal level of cyan is not smaller than the first signal level and the signal levels of other colors are smaller than the second signal level.

FIG. 11A and FIG. 11B are charts that show composite amounts and the like of cyan according to the alternative example 1. FIG. 11A represents the signal levels of red, green, blue and cyan before the mixing processing, and FIG. 11B represents the signal levels and mixing ratio of red, green, blue and cyan after the mixing processing. The color mixing section increases the signal level of cyan from 0 to 30 when green of primary color is displayed, i.e., when the signal level of green is 255 and signal levels of red, blue and cyan are 0 as shown in FIG. 11A. In addition, the color mixing section increases the signal level of cyan from 0 to 20 when blue of primary color is displayed, i.e., when the signal level of blue is 255 and signal levels of red, green and cyan are 0 as shown in FIG. 11A.

On the other hand, the RGB→RGBC changing section decreases the luminance signal level of cyan from 255 to 230 when cyan of primary color is displayed, i.e., when the luminance signal level of cyan is 255 and the signal levels of red, green and blue are 0.

In the alternative example 1, it is possible to increase the luminance of each pixel, especially the luminance of green and blue, without decreasing the color purity of four primary colors wherever possible. Furthermore, it is possible to make the luminance ratio of each color configuring white become closer to the REC 709 wherever possible.

Alternative Example 2

The liquid crystal television according to the alternative example 2 includes a color filter for four primary colors 213 for red (R), green (G), blue (B) and magenta (M), the contents of processing performed by the television signal processing section 7 are different from those of previous example. The differences are mainly explained below.

Figure 12A:
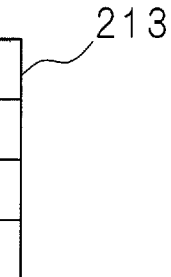
FIG. 12A is an explanation view that schematically shows an example configuration of color filter for four primary colors according to an alternative example 2.
Figure 12B:
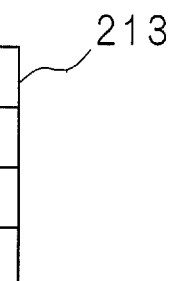
FIG. 12B is an explanation view that schematically shows an example configuration of color filter for four primary colors according to the alternative example 2.

FIG. 12A and FIG. 12B are explanation views that schematically show example configurations of the color filter for four primary colors 213 according to the alternative example 2. As shown in FIG. 12A and FIG. 12B, the color filter for four primary colors 213 according to the alternative example 2 has pixel filters for four colors, i.e., red, green, blue and magenta, which are arranged in correspondence with each pixel of the liquid crystal panel 11. Each pixel filter for red (R), green (G), blue (B) and magenta (M) may be arranged in the lateral direction.

The color converting circuit of the television signal processing section 7 according to the alternative example 2 includes a color mixing section that is not shown in drawings but performs processing for mixing magenta into red or blue when red or blue of primary color is displayed on the liquid crystal panel 11. Particularly, the color mixing section performs processing for increasing the signal level of magenta, when the signal level of red or blue is not smaller than a first signal level and the signal levels of other colors are smaller than a second signal level that is smaller than the first signal level.

In addition, the color converting circuit 73 includes an R increasing section that is not shown in drawings but increases the signal level of red when red is displayed, and a B increasing section that is not shown in drawings but increases the signal level of blue when blue is displayed. The R increasing section performs the processing for increasing the signal level of red, when the signal level of red is smaller than the first signal level and the signal levels of other colors are smaller than the second signal level. Similarly, the B increasing section performs the processing for increasing the signal level of blue, when the signal level of blue is smaller than the first signal level and the signal levels of other colors are smaller than the second signal level.

Furthermore, the color converting circuit 73 includes an RGB→RGBM changing section that is not shown in drawings but decreases the signal level of magenta when magenta is displayed. Particularly, the RGB→RGBM changing section performs the processing for increasing the signal levels of red and blue, and decreasing the luminance signal of magenta, when the signal level of magenta is not smaller than the first signal level and the signal levels of other colors are smaller than the second signal level.

FIG. 13A and FIG. 13B are charts that show composite amounts and the like of magenta according to the alternative example 2. FIG. 13A represents the signal levels of red, green, blue and magenta before the mixing processing, and FIG. 13B represents the signal levels and mixing ratio of red, green, blue and magenta after the mixing processing. The color mixing section increases the signal level of magenta from 0 to 30 when red of primary color is displayed, i.e., when the signal level of red is 255 and signal levels of green, blue and magenta are 0 as shown in FIG. 13A. In addition, the color mixing section increases the signal level of magenta from 0 to 20, when blue of primary color is displayed, i.e., when the signal level of blue is 255 and signal levels of red, green and magenta are 0 as shown in FIG. 13A.

On the other hand, the RGB→RGBM changing section decreases the luminance signal level of magenta from 255 to 230 when magenta of primary color is displayed, i.e., when the luminance signal level of magenta is 255 and the signal levels of red, green and blue are 0.

In the alternative example 2, it is possible to increase the luminance of each pixel, especially the luminance of red and blue, without decreasing the color purity of four primary colors wherever possible. Furthermore, it is possible to make the luminance ratio of each color configuring white become closer to the REC 709, wherever possible.

Embodiment 2

FIG. 14 is a block diagram that shows an example configuration of the television signal processing section 7. The television signal processing section 7 according to the present Embodiment 2 includes not only the color attribute changing circuit 71, the gamma correction circuit 72 and the color converting circuit 73, but also a system controlling section 74, an input signal switching section 75 and a contents judging section 76. Other configurations are similar to those of the Embodiment 1 described above. Thus, similar configurations are applied with the same numerals and not explained in detail.

The input signal switching section 75 includes plural input terminals, and the tuner 4 is connected to one of the plural input terminals. An external device, for example, a BD recorder, hard disk recorder, digital still camera, digital video camera, game machine, PC (personal Computer), portable terminal and the like, can be connected to another input terminal. It should be noted that the BD recorder and hard disk recorder may be formed integrally.

The system controlling section 74 controls each component of the television signal processing section 7 based on the signal accepted by the accepting section 8. When a user wants to utilize the liquid crystal television for seeing the video image signal provided by the telecast (television broadcast) or for playing the video image signal recorded in any of the external devices, the user can utilize a remote control apparatus (not shown in drawings) for instructing the want. When the user instructs to see the telecast signal, the system controlling section 74 gives an instruction to the input signal switching section 75 and the instruction indicates to select the color video image signal coming from the tuner 4. When the user instructs to play the signal recorded in any of the external devices, the system controlling section 74 gives an instruction to the input signal switching section 75 and the instruction indicates to select the video image signal coming from the selected external device.

The input signal switching section 75 selects one input terminal based on the instruction of the system controlling section 74, and gives the video image signal inputted through the selected input terminal onto the contents judging section 76. Therefore, the video image signal (telecast signal or video image signal from external device) selected by the user can be adequately switched and given to other sections by the input signal switching section 75.

The contents judging section (judging section) 76 judges the category (type) of video image signal as the contents, based on the video image signal given by the input signal switching section 75. For example, when the contents information (category information) is added to the telecast signal, the contents judging section 76 obtains the contents information from the inputted video image signal, and identifies the category of the video image signal. For example, the movie, sport, news, variety show and the like are considered as the category of contents. The contents judging section 76 gives the contents information obtained from the video image signal or category identified by the contents information to the system controlling section 74. It should be noted that the system controlling section 74 makes the contents judging section 76 identify the category of video image signal only when the user selects to see the telecast signal.

As the system controlling section 74 controls the performance of each component in the television signal processing section 7 based on the contents information or category given by the contents judging section 76, it is possible to implement the optimal signal processing based on the category of contents.

The contents judging section 76 directly gives the video image signal from the input signal switching section 75 to the color attribute changing circuit 71. If the input signal switching section 75 is configured to give the video image signal not only to the contents judging section 76 but also to the color attribute changing circuit 71, the contents judging section 76 is not required to give the video image signal from the input signal switching section 75 to the color attribute changing circuit 71. The color attribute changing circuit 71 according to the Embodiment 2 performs processing onto the video image signal given by the contents judging section 76 (or the input signal switching section 75).

Figure 15:
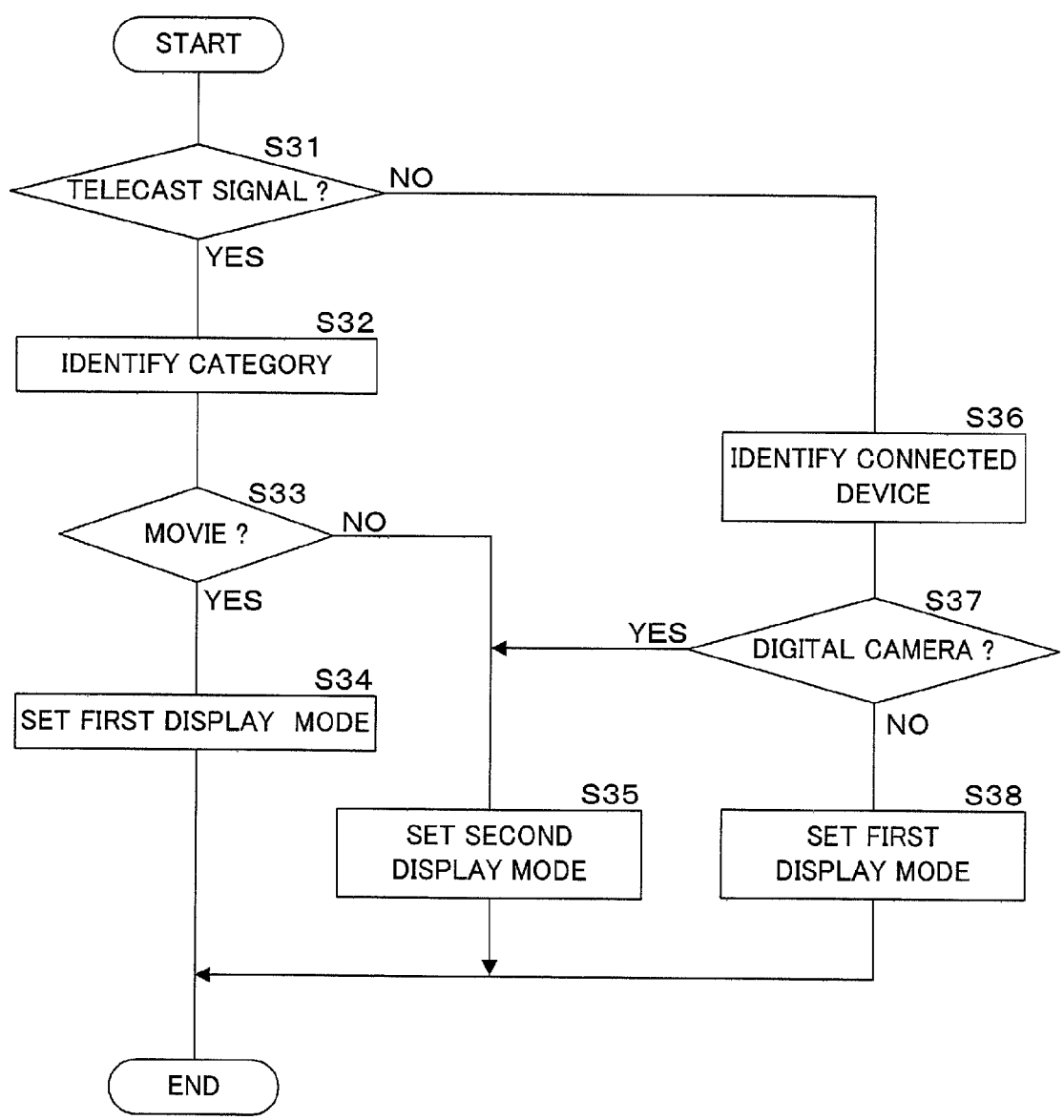
FIG. 15 is a flowchart that shows a procedure of the television signal processing section according to an Embodiment 2.

FIG. 15 is a flowchart that shows a procedure of the television signal processing section 7 according to the Embodiment 2. The television signal processing section 7 according to the Embodiment 2 judges on the basis of the signal accepted by the accepting section 8 whether the input signal switching section 75 selects the telecast signal or not (step S31). When having judged that the telecast signal is selected (step S31: YES), the television signal processing section 7 identifies the category of color video image signal in telecast by the contents judging section 76 (step S32).

The television signal processing section 7 judges whether the identified category is the movie or not (step S33). When having judged that the identified category is the movie (step S33: YES), the television signal processing section 7 sets the first display mode (step S34) and ends the procedure. When the first display mode is set, the television signal processing section 7 performs processing similar to the processing explained with FIG. 6 in the above Embodiment 1. In short, the television signal processing section 7 performs the processing similar to the processing performed in the above Embodiment 1 when the display mode accepting section 8a accepts the first display mode. On the other hand, when having judged that the identified category is not the movie (step S33: NO), the television signal processing section 7 sets the second display mode (step S35), and ends the procedure. It should be noted that the television signal processing section 7 does not perform the processing similar to the processing explained with FIG. 6 in the above Embodiment 1 when the second display mode is set. At that time, the color converting circuit 73 of the television signal processing section 7 utilizes the RGB→RGBY changing section 73d to perform only the processing for converting the signals of red, green and blue given by the gamma correction circuit 72 into the signals of red, green, blue and yellow corresponding to each color pixel of color filter for four primary colors 13.

When it has been judged at the step S31 that the input signal switching section 75 does not select the telecast signal (step S31: NO), i.e., when the input signal switching section 75 has selected the video image signal from external device, the television signal processing section 7 identifies the connected device (step S36).

The television signal processing section 7 judges whether or not the identified device is a digital still camera or digital video camera (both devices are together represented as one component, digital camera, in FIG. 15) (step S37). When having judged that the identified device is the digital camera (step S37: YES), the television signal processing section 7 sets the second display mode (step S35), and ends the procedure. On the other hand, when having judged that the identified device is not the digital camera (step S37: NO), the television signal processing section 7 sets the first display mode (step S38) and ends the procedure.

When a user selects to see the telecast, the above procedure can implement the optimal signal processing for the category of video image signal in telecast. When the user selects to see the video image recorded in the external device, the above procedure can implement the optimal signal processing for the video image signal from the external device. Therefore, it is possible to implement the adequate image quality for respective video image signals, based on the category of telecast signal or the external device.

Although the processing of color converting circuit 73 is switched by the judgment whether the category of telecast signal is the movie or not in the above procedure, it may be configured that the processing of color converting circuit 73 is adequately switched for each category. In addition, although the processing of color converting circuit 73 is switched by the judgment whether the external device is the digital camera or not in the above procedure, it may be configured that the processing of color converting circuit 73 is adequately switched for each type of device.

In the procedure shown in FIG. 15, the signal processing is switched in accordance with the category of video image signal when the telecast signal is selected. However, it may be configured to switch the signal processing based on the category of video image signal from the external device even when the video image signal from external device is selected. At that time, the system controlling section 74 can make the contents judging section 76 identify the category of video image signal not only when the user selects to see the telecast signal but also when the user selects to perform the play processing of external device.

Figure 16:
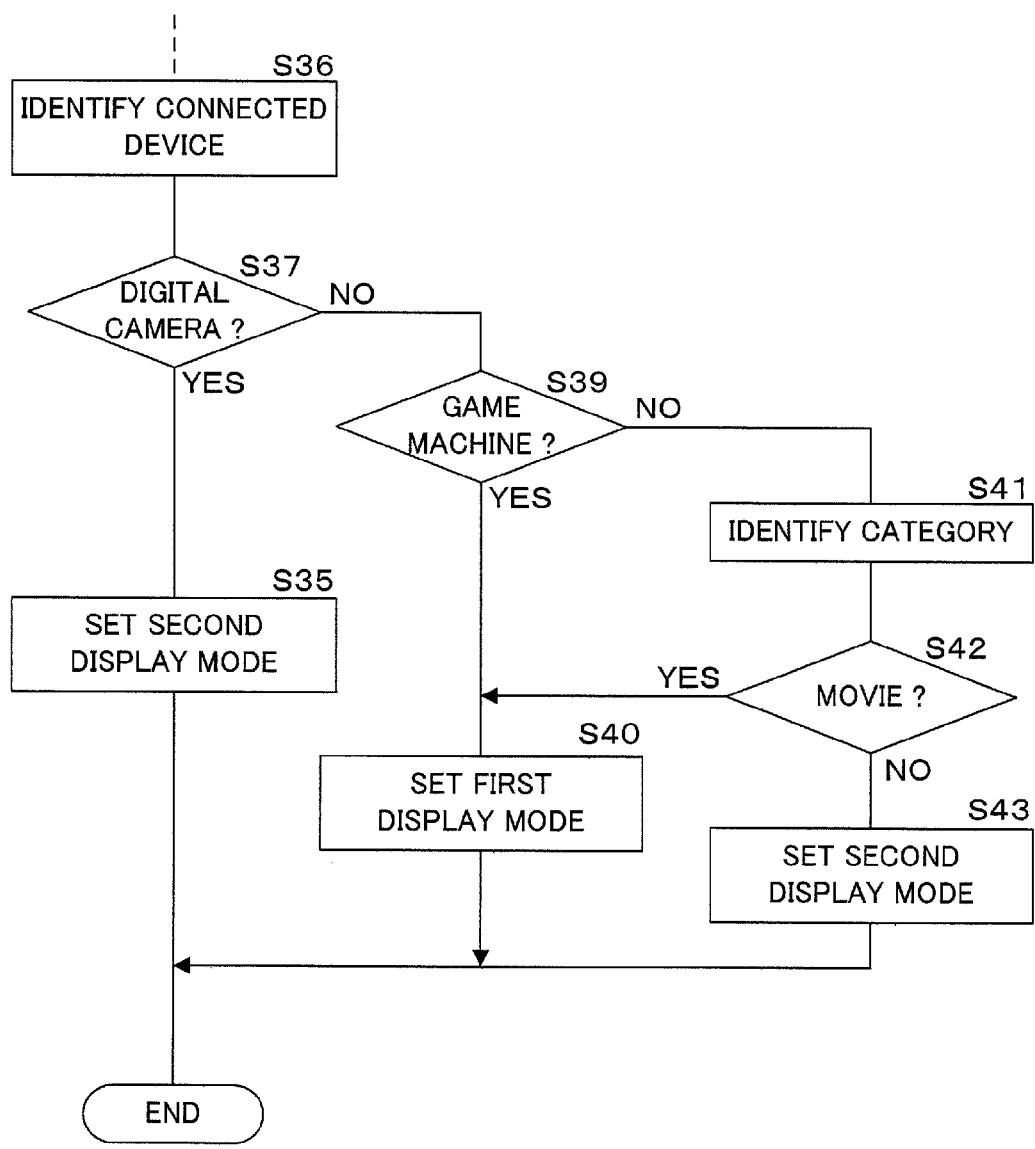
FIG. 16 is a flowchart that shows a procedure of the television signal processing section according to the Embodiment 2.

FIG. 16 is a flowchart that shows a procedure of the television signal processing section 7 according to the Embodiment 2. The television signal processing section 7 performs processing similar to the steps S31-S37 in the flowchart of FIG. 15. Then, when having judged that the identified device is not the digital camera (step S37: NO), the television signal processing section 7 judges whether the identified device is the game machine or not (step S39). When having judged that the identified device is the game machine (step S39: YES), the television signal processing section 7 sets the first display mode (step S40) and ends the procedure.

On the other hand, when having judged that the identified device is not the game machine (step S39: NO), i.e., when the external device is the BD, hard disk, PC, portable terminal or the like, the television signal processing section 7 utilizes the contents judging section 76 to identify the category of video image signal inputted from the external device (step S41). In recording the telecast signal, the external device can record the contents information added to the telecast signal, too. Thus, it may be configured that the contents information is also outputted when the recorded telecast signal (video image signal) is outputted to the liquid crystal television. Therefore, by utilizing such an external device, the contents judging section 76 can identify the category based on the contents information inputted together with the video image signal from the external device. In addition, when the external device can register the category by a user's manual operation while recording the video image signal except for the telecast signal, the contents judging section 76 can identify the category based on the information about the category inputted together with the video image signal from the external device.

The television signal processing section 7 judges whether the identified category is the movie or not (step S42). When having judged that the identified category is the movie (step S42: YES), the television signal processing section 7 sets the first display mode (step S40), and ends the procedure. On the other hand, when having judged that the identified category is not the movie (step S42: NO), the television signal processing section 7 sets the second display mode (step S43) and ends the procedure.

The procedure described above can implement the optimal signal processing not only for the type of device but for the category of video image signal from the external device, when a user selects the video image signal from the external device.

In the procedure described above, when the video image signal from external device except for the digital still camera, digital video camera and game machine is selected, the processing of color converting circuit 73 is switched on the basis of the judgment whether the category of video image signal is the movie or not. In addition to such a configuration, it may be configured that the processing of color converting circuit 73 is switched on the basis of category for the video image signal from the digital still camera, digital video camera or game machine.

The television signal processing section 7 according to the Embodiment 2 is configured to switch the processing of color converting circuit 73 based on the video image signal switched by the input signal switching section 75. Furthermore, the television signal processing section 7 according to the embodiment 2 may be configured to adequately switch the gamma correction processing performed by the gamma correction circuit 72, based on the video image signal switched by the input signal switching section 75, i.e., based on the processing of color converting circuit 73. Particularly, a gamma curve utilized for the gamma correction processing by the gamma correction circuit is changed in accordance with the processing of color converting circuit 73. In that case, not only realizing the gamut satisfying the REC 709 standard but also optimizing the gamma curve can be implemented in accordance with the contents (video image signal) selected by the user. Therefore, it is possible to provide the optimal environment for seeing the video image signal. For example, when a user sees the movie contents, it is possible to provide the gamma curve (gamma of 2.2) optimal for the movie contents.

Alternative examples similar to the examples explained in the above Embodiment 1 including the alternative examples 1 and 2 can be applied to the liquid crystal television according to the Embodiment 2, too.

It should be understood that the embodiments described above are only illustrative but not limitative. The liquid crystal television may include not only a tuner and a playing device such as a BD recorder but also a means for externally inputting video image signal of personal computer or the like. In other words, the scope of the invention is defined in the claims and includes all changes that fall within metes and bounds of the claims or equivalence of such metes and bounds thereof, but not limited to the above description.

It should be understood that the embodiments described above are only illustrative of the present invention and that various modifications may be made thereto without departing from the scope of the invention as defined in the claims. In other words, all changes that fall within metes and bounds of the claims or equivalence of such metes and bounds thereof are therefore intended to be embraced by the claims.

The invention claimed is:

1. A liquid crystal display apparatus that includes a liquid crystal panel which has color filters for red, green and blue and a color filter for yellow that includes a backlight which emits light to the liquid crystal panel, that converts an inputted color video image signal into signals representing red, green, blue and the complementary color regarding the color video image, and that displays a color video image based on each converted signal, comprising:
a color mixing section that, mixes the yellow into red or green when red or green is displayed and performs a processing for increasing a signal level of yellow when a signal level of red or green is not smaller than a first signal level and signal levels of other colors are smaller than a second signal level that is smaller than the first signal level.

2. The liquid crystal display apparatus according to claim 1,
wherein an amount for increasing the signal level of yellow when the signal level of green is not smaller than the first signal level is larger than an amount for increasing the signal level of yellow when the signal level of red is not smaller than the first signal level.

3. The liquid crystal display apparatus according to claim 1, further comprising:
an increasing section that, when red or green is displayed, increases the signal level of red or green.

4. The liquid crystal display apparatus according to claim 1, further comprising:
a changing section that, when yellow is displayed, increases the signal levels of red and green and decreases the signal level of yellow.

5. The liquid crystal display apparatus according to claim 1, further comprising:
a composite amount accepting section that accepts a composite amount of yellow,
wherein the color mixing section is configured to perform a processing for increasing the signal level of yellow based on the composite amount accepted by the composite amount accepting section.

6. A liquid crystal display apparatus that includes a liquid crystal panel which has color filters for red, green, blue, and yellow that includes a backlight which emits light to the liquid crystal panel, which converts an inputted color video image signal into signals representing red, green, blue, and yellow regarding the color video image and that displays a color video image based on each converted signal, comprising:
a color mixing section that mixes yellow into red or green when red or green is displayed; and
a composite necessity accepting section that accepts a necessity of composite,
wherein the color mixing section is configured to perform a processing for mixing yellow when the composite necessity accepting section accepts that the composite is necessary.

7. A liquid crystal display apparatus that includes a liquid crystal panel which has color filters for red, green, blue, and yellow that includes a backlight which emits light to the liquid crystal panel, which converts an inputted color video image signal into signals representing red, green, blue, and yellow regarding the color video image, and that displays a color video image based on each converted signal, comprising:
a color mixing section that mixes yellow into red or green when red or green is displayed;
a display mode accepting section that accepts a switch of display mode; and
a table that stores an amount for mixing yellow to red or green,
wherein the color mixing section is configured to utilize the table for mixing yellow to red or green, when a display mode is switched to a predetermined display mode.

8. A liquid crystal display apparatus that includes a liquid crystal panel which has color filters for red, green and blue and a color filter for at least one complementary color of cyan, magenta and yellow having complementary color relationship to each of red, green and blue, that includes a backlight which emits light to the liquid crystal panel, that converts an inputted color video image signal into signals representing red, green, blue and the complementary color regarding the color video image, and that displays a color video image based on each converted signal, comprising:

a color mixing section that, when red, green or blue of primary color not having complementary color relationship to the complementary color is displayed, mixes the complementary color into red, green or blue of primary color; and a judging section that judges a type of the color video image, wherein the color mixing section is configured to perform a mixing processing based on a result of judgment performed by the judging section.

9. A liquid crystal display apparatus that includes a liquid crystal panel which has color filters for red, green and blue and a color filter for at least one complementary color of cyan, magenta and yellow having complementary color relationship to each of red, green and blue, that includes a backlight which emits light to the liquid crystal panel, that converts an inputted color video image signal into signals representing red, green, blue and the complementary color regarding the color video image, and that displays a color video image based on each converted signal, comprising:

a color mixing section that, when red, green or blue of primary color not having complementary color relationship to the complementary color is displayed, mixes the complementary color into red, green or blue of primary color; and a judging section that judges about a device which is a source sending the color video image signal, wherein the color mixing section is configured to perform a mixing processing based on a result of judgment performed by the judging section.

10. The liquid crystal display apparatus according to claim 1, claim 6, claim 7, claim 8, or claim 9, further comprising:

a gamma correction processing section that performs a gamma correction processing onto a signal of each color based on a mixing processing performed by the color mixing section.

11. A liquid crystal television, comprising:

a video image receiving section that receives a color video image signal; and the liquid crystal display apparatus according to claim 1, claim 6, claim 7, claim 8, or claim 9, wherein the liquid crystal display apparatus is configured to display a color video image based on the color video image signal received by the video image receiving section.

* * * * *